United States Patent
McCloskey et al.

(10) Patent No.: US 10,263,826 B1
(45) Date of Patent: Apr. 16, 2019

(54) METHOD OF INITIATING EXECUTION OF MAINFRAME JOBS FROM A VIRTUAL TAPE SERVER

(71) Applicant: EMC Corporation, Hopkinton, MA (US)

(72) Inventors: Larry W. McCloskey, Burlington, MA (US); Karyn M. Kelley, Peabody, MA (US); Sandra J. Goodwin-Jette, Hudson, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 396 days.

(21) Appl. No.: 14/041,456

(22) Filed: Sep. 30, 2013

(51) Int. Cl.
*H04L 12/24* (2006.01)
*G06F 11/14* (2006.01)

(52) U.S. Cl.
CPC .......... *H04L 41/00* (2013.01); *G06F 11/1464* (2013.01)

(58) Field of Classification Search
CPC ...................................................... H04L 67/10
See application file for complete search history.

(56) References Cited

U.S. PATENT DOCUMENTS

| | | | |
|---|---|---|---|
| 5,867,648 A * | 2/1999 | Foth | H04L 29/06 709/217 |
| 7,200,546 B1 | 4/2007 | Nourmohamadian | |
| 7,961,415 B1 | 6/2011 | Feller | |
| 9,436,591 B1 | 9/2016 | McCloskey | |
| 2003/0204672 A1 * | 10/2003 | Bergsten | G06F 3/0611 711/114 |
| 2004/0153614 A1 * | 8/2004 | Bitner | G06F 3/0604 711/162 |
| 2005/0049849 A1 | 3/2005 | Re | |
| 2005/0060704 A1 * | 3/2005 | Bulson | G06F 9/5077 718/1 |
| 2009/0193145 A1 * | 7/2009 | Coronado | G06F 3/0605 709/240 |
| 2010/0057790 A1 * | 3/2010 | Johnson | G06F 3/0605 707/E17.007 |
| 2010/0180074 A1 | 7/2010 | Slater et al. | |
| 2010/0186018 A1 * | 7/2010 | Bell, Jr. | G06F 9/5088 718/104 |
| 2014/0195493 A1 * | 7/2014 | Akirav | G06F 17/30156 707/692 |
| 2015/0074677 A1 * | 3/2015 | Pream | G06F 9/5083 718/104 |

OTHER PUBLICATIONS

'Batch Processing Guide'. SLAC Manual [online]. Dec. 7, 2008 [retrieved Dec. 31, 2015]. Retrieved from the Internet: <URL:https://web.archive.org/web/20081207193508/http://slac.stanford.edu/BFROOT/www/doc/workbook/batch/batch.html>.*

(Continued)

*Primary Examiner* — Sm A Rahman
*Assistant Examiner* — Dae Kim
(74) *Attorney, Agent, or Firm* — Hamilton, Brook, Smith & Reynolds, P.C.

(57) ABSTRACT

In one embodiment, a method can include notifying, from a mainframe, a virtual tape server that the mainframe is available to accept a job over a virtual tape channel. The method can also include, responsive to receiving at least one job data message of the job, sending, from the mainframe, a job receipt confirmation to the virtual tape server.

20 Claims, 5 Drawing Sheets

(56) References Cited

OTHER PUBLICATIONS

"Why Switched FICON? (Switched FICON vs. Direct-Attached FICON)" Brocade Communications Systems Website, 2011 [retrieved on Dec. 8, 2017]. Retrieved from the Internet <URL:https://www.brocade.com/content/dam/common/documents/content-types/whitepaper/oem-ibm-why-ficon-wp.pdf>.*
"What is a mainframe? It's a style of computing", IBM Knowledgebase Center, Feb. 14, 2019 [retrieved on Feb. 14, 2019]. Retrieved from the Internet: <URL: https://www.ibm.com/support/knowledgecenter/zosbasics/com.ibm.zos.zmainframe/zconc_whatismainframe.htm>. (Year: 2019).*
"What is a Mainframe?" Mainframes.com website, Feb. 14, 2019 [retrieved on Feb. 14, 2019]. Retrieved from the Internet: <URL: http://www.mainframes.com>. (Year: 2019).*
Final Office Action dated Aug. 14, 2015 for U.S. Appl. No. 14/041,314 entitled "Out-Of-Band File Transfers Between a Host and Virtual Tape Server".
Non-Final Office Action dated Mar. 3, 2015 for U.S. Appl. No. 14/041,314.
Office Action dated Jan. 29, 2016 for U.S. Appl. No. 14/041,314.
Notice of Allowance dated Jun. 2, 2016 for U.S. Appl. No. 14/041,314.
EMC Disk Library for mainframe User Guide for Dlm8000; 2013; EMC Corporation; Version 3.4.1; pp. 1-152.

\* cited by examiner

METHOD OF INITIATING EXECUTION OF MAINFRAME JOBS FROM A VIRTUAL TAPE SERVER

BACKGROUND

A virtual tape server can include multiple directories in which virtual tapes are mounted. Directories, and the virtual tapes mounted on the directories, can be accessed by systems coupled with storage systems. A mainframe can be coupled with an input/output controller which communicates with the virtual tape server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

In one embodiment, a method can include notifying, from a mainframe, a virtual tape server that the mainframe is available to accept a job over a virtual tape channel. The method can also include, responsive to receiving at least one job data message of the job, sending, from the mainframe, a job receipt confirmation to the virtual tape server.

In another embodiment, the method can further include receiving, at the mainframe, the at least one job data message. The method can further include, responsive to receiving a status message that a last of the at least one job data message of the job is sent, processing the job at the mainframe. The method can additionally include, responsive to finishing the processing of the job at the mainframe, notifying, from the mainframe, the virtual tape server that the mainframe is available to process a next job over the virtual tape channel. The at least one job data message can be based on job data in the virtual tape server, and the job data can be stored in a non-virtual tape drive portion of the virtual tape server.

In one embodiment, a system can include a notification module configured to notify, from a mainframe, a virtual tape server that the mainframe is available to a job over a virtual tape channel. The system can further include a confirmation module configured to send, responsive to receiving at least one job data message of the job, from the mainframe, a job receipt confirmation to the virtual tape server.

In another embodiment, a method can include, responsive to a notification from a mainframe that the mainframe is accepting a job, sending, from a virtual tape server, at least one job message of a job to the mainframe. The method can further include upon sending a last of the at least one job messages of the job to the mainframe, sending a finished status message, from the virtual tape server, indicating the job has been transferred to the mainframe.

In an embodiment, the method can further include receiving, at the virtual tape server, the notification that the mainframe is accepting the job. The method can further include loading the job from a non-virtual tape portion of the virtual tape server. The method can further include dividing the job into the at least one job messages. The at least one job data message can be based on job data in the virtual tape server, and the job data can be stored in a non-virtual tape drive portion of the virtual tape server.

In another embodiment, a system can include a job transfer module configured to send, from a virtual tape server, responsive to a notification from a mainframe that the mainframe is accepting a job, at least one job message of a job to the mainframe. The system can also include a status message module configured to send, from the virtual tape server, upon sending a last of the at least one job messages of the job to the mainframe, a finished status message indicating the job has been transferred to the mainframe.

Figure 1:
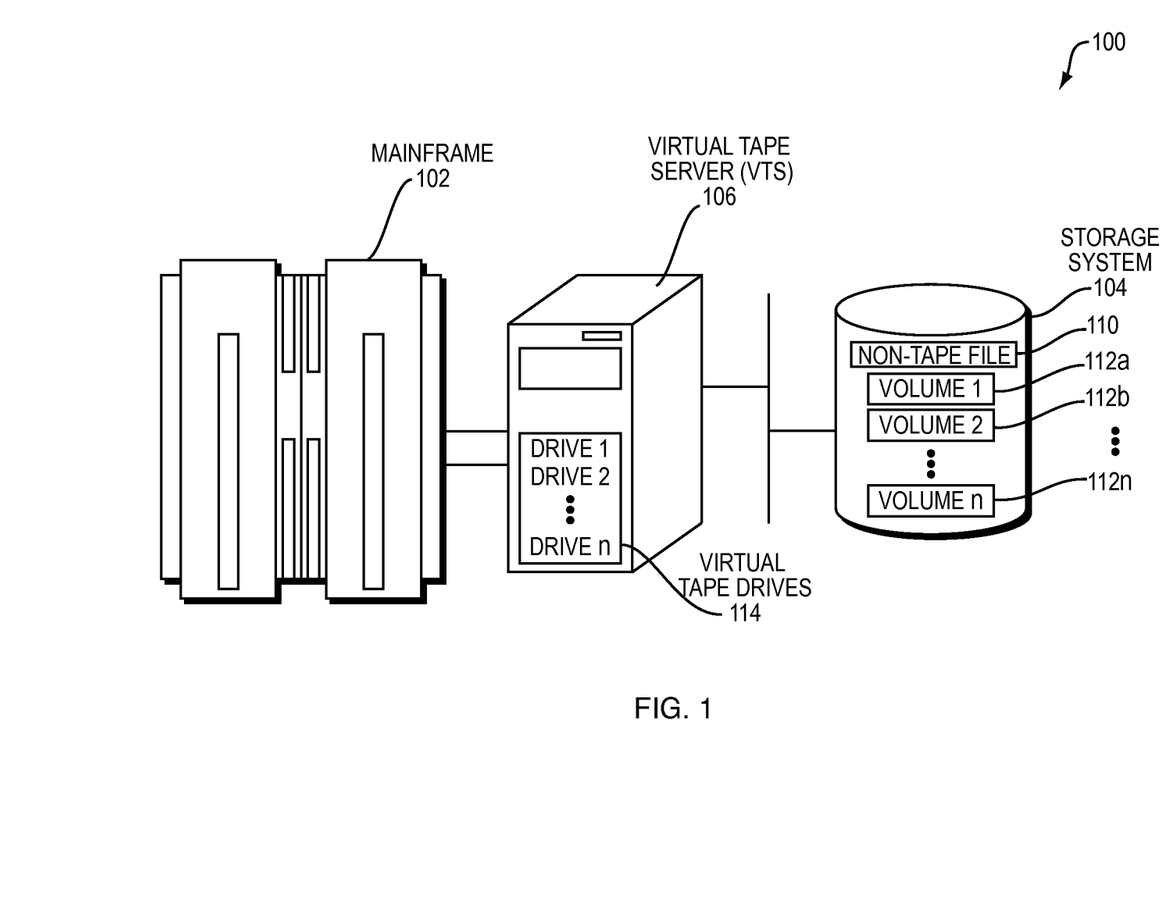
FIG. 1 is a block diagram illustrating an example embodiment employing a mainframe computer operatively coupled with a virtual tape server.

FIG. 1 is a block diagram 100 illustrating an example embodiment employing a mainframe computer 102 operatively coupled with a virtual tape server ("VTS") 106 (e.g., a input/output controller), which is operatively coupled with a storage system 104. The VTS 106 can also be referred to as a 'node,' and the mainframe computer as a 'host.' The Disk Library for Mainframe ("DLm"), a product of EMC Corporation of Hopkinton, Mass., is one example of a virtual tape server ("VTS") 106 (e.g., an input/output controller). The mainframe interfaces with the VTS to access virtual tape drives 114, which are presented representations of the data stored in volumes 112a-n of the storage system 104. The storage system 104 can also store non-tape data in a non-tape file 110.

In an embodiment of the present invention, a method of initiating the execution of jobs on a mainframe host from a virtual tape server ("VTS"), specifically a Disk Library for Mainframes (DLm), does not use conventional file transfer or job submission means.

Previously, several methods for submitting jobs for execution on a mainframe, both on the mainframe itself or from a remote user, use conventional file transfer or job submission means. On the mainframe itself, jobs may be initiated by mainframe scheduling software, or manually by operators or users of the mainframe. From a remote location, jobs may be initiated over a network connection via File Transfer Protocol (FTP) or other networking protocol.

In an embodiment of the present invention, "out-of-band" job submission provides a method to initiate mainframe jobs over the channel connection between a virtual tape server and the mainframe, without requiring a network interface between the two and without mounting, writing, and/or reading virtual tapes. The job submission is "out of band" in the sense that the protocol operates independently and transparently to the normal VTS operation.

Figure 2:
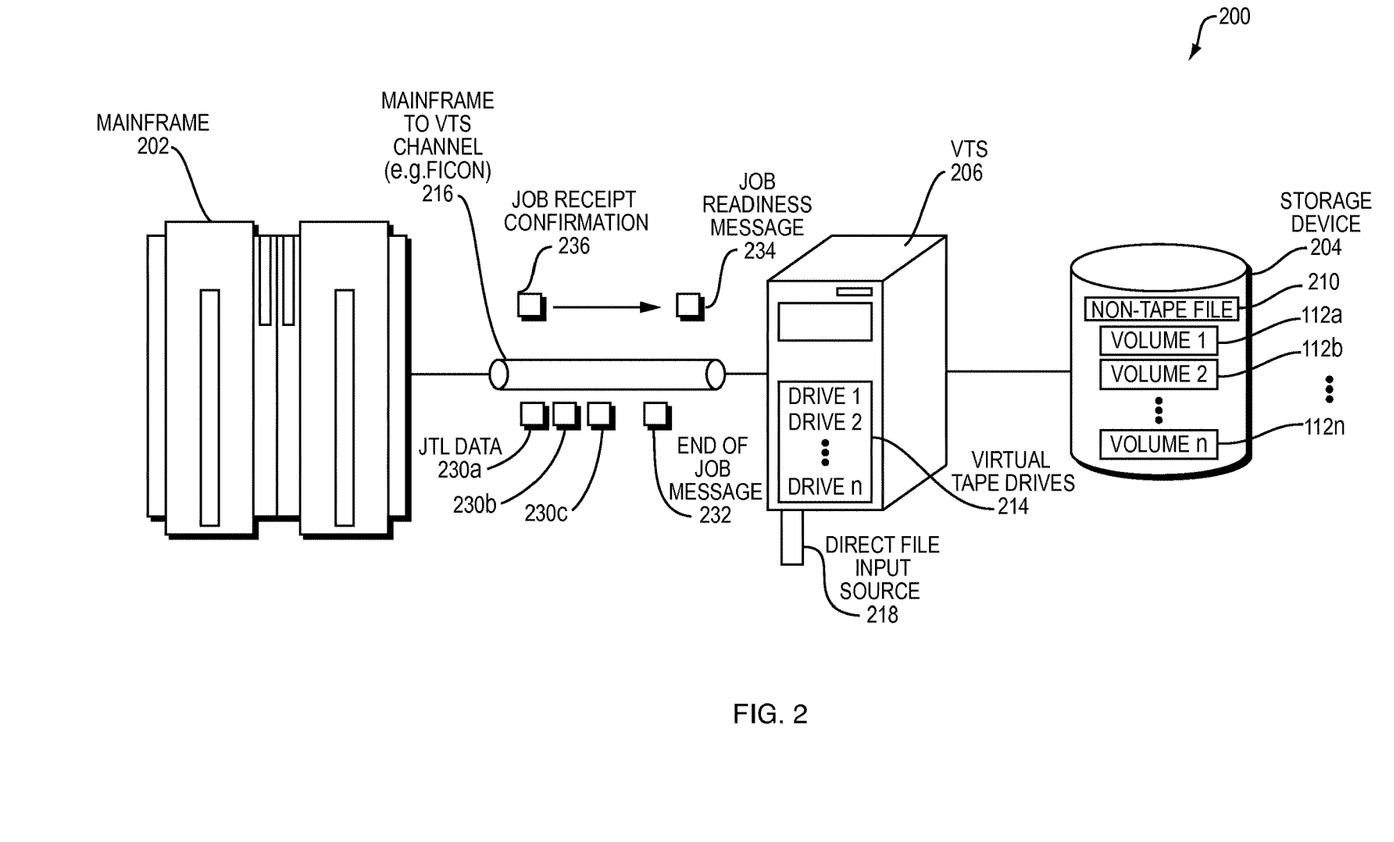
FIG. 2 is a block diagram illustrating an example embodiment of the present invention.

FIG. 2 is a block diagram 200 illustrating an example embodiment of the present invention. A mainframe 202 is coupled to a virtual tape server (VTS) 206 with a Mainframe to VTS channel 216 (e.g., FICON). The VTS 206 is operatively coupled (or can include) a storage device 204. The storage device includes a non-tape file 210 and a plurality of tape volumes 112a-n. The VTS, in turn, represents the plurality of virtual tape drives 214. The mainframe 202 can access the virtual tape drives 214 by reading and writing to the virtual tape drives 214 over the mainframe to VTS channel 216.

The non-tape file 210 of the storage device 204 can store "job" data that the VTS 206 can send to the mainframe to execute. However, traditionally the mainframe 202 does not have a way to access the non-tape file 210 through the mainframe to VTS channel 216, and would need a user to use a direct file input source 218 to read the non-tape file 210 and copy the data to the mainframe 202. Examples of the direct file input source 218 include FTP and RJE.

To receive job data from the VTS 206, the mainframe broadcasts a job readiness message 234 to the VTS 206. The job readiness message 234 is a message native to the mainframe to VTS channel 216. The VTS 206, responsive to receiving the message 234, determines the mainframe 202 is ready to receive a job from the VTS 206. The VTS 206 loads a job from non-tape file 210. The VTS 206 then sends the job data 230a-c to the mainframe 202. In one embodiment, the job data 230a-c is in multiple packets or messages, but can be sent in any number, one or more, of packets or messages. The mainframe 202 stores the job data 230a-c as it is received in a queue.

Upon sending the last part of the job data 230c, the VTS 206 also sends an end of job message 232 to the mainframe 202. The end of job message 232 alerts the mainframe 202 that the job data 230a-c has been completely sent. The mainframe 202 can then send a job receipt confirmation 236 to the VTS 206. The job receipt confirmation 236 can indicate that the mainframe 202 received the entire job (e.g., a success) or that the mainframe 202 did not receive the entire job (e.g., a failure). Once the mainframe 202 receives the job, it executes the job code.

Figure 3:
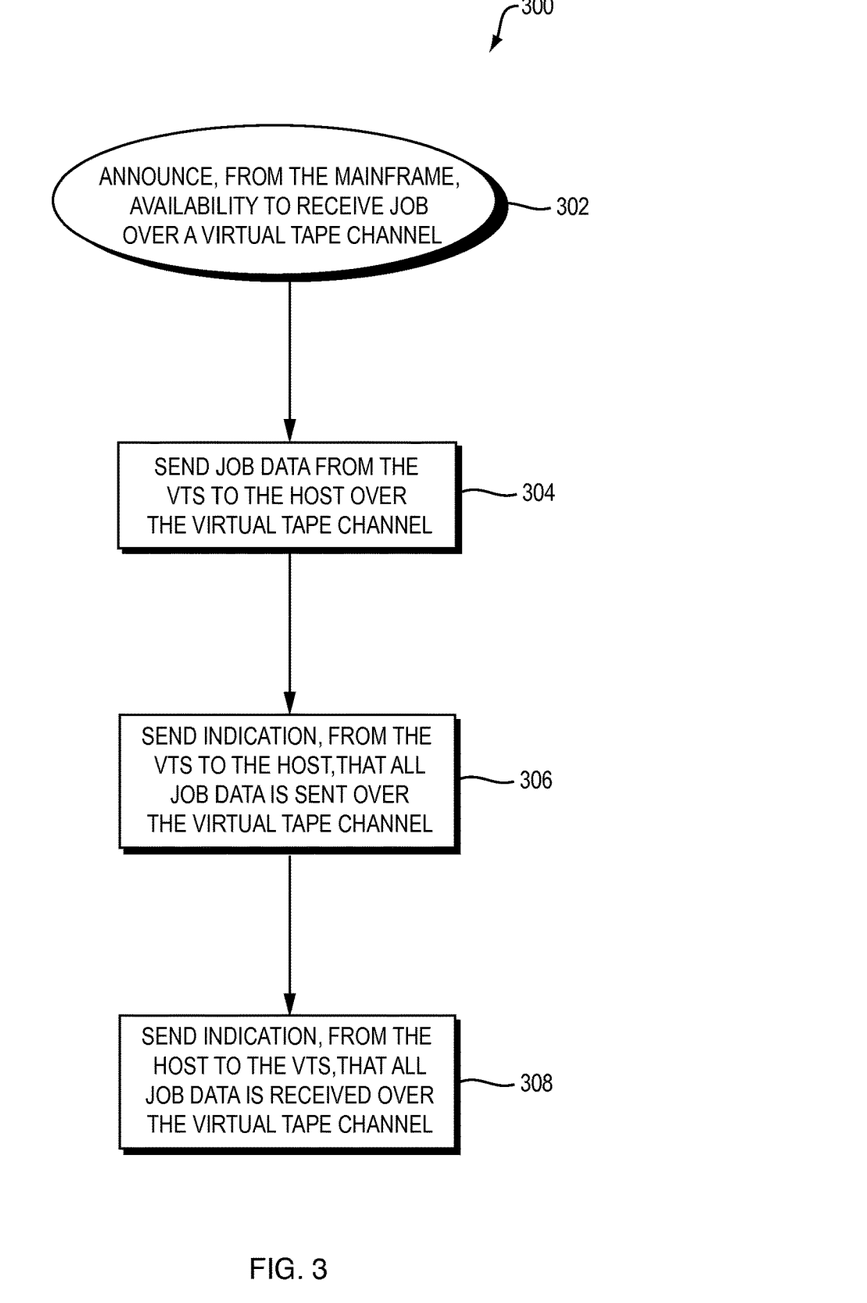
FIG. 3 is a flow diagram illustrating an example embodiment a process employed by the present invention.

FIG. 3 is a flow diagram illustrating an example embodiment a process 300 employed by the present invention. The process begins by announcing, by the mainframe, an availability of the mainframe to receive a job from the VTS (302). Then, the VTS sends job data from the VTS to the mainframe in one or more messages (304). After the last job message, the VTS sends a message that the job data is finished sending (306). Then, the mainframe sends a message to the VTS that it has either received the job or that the job did not transfer correctly (308).

Figure 4:
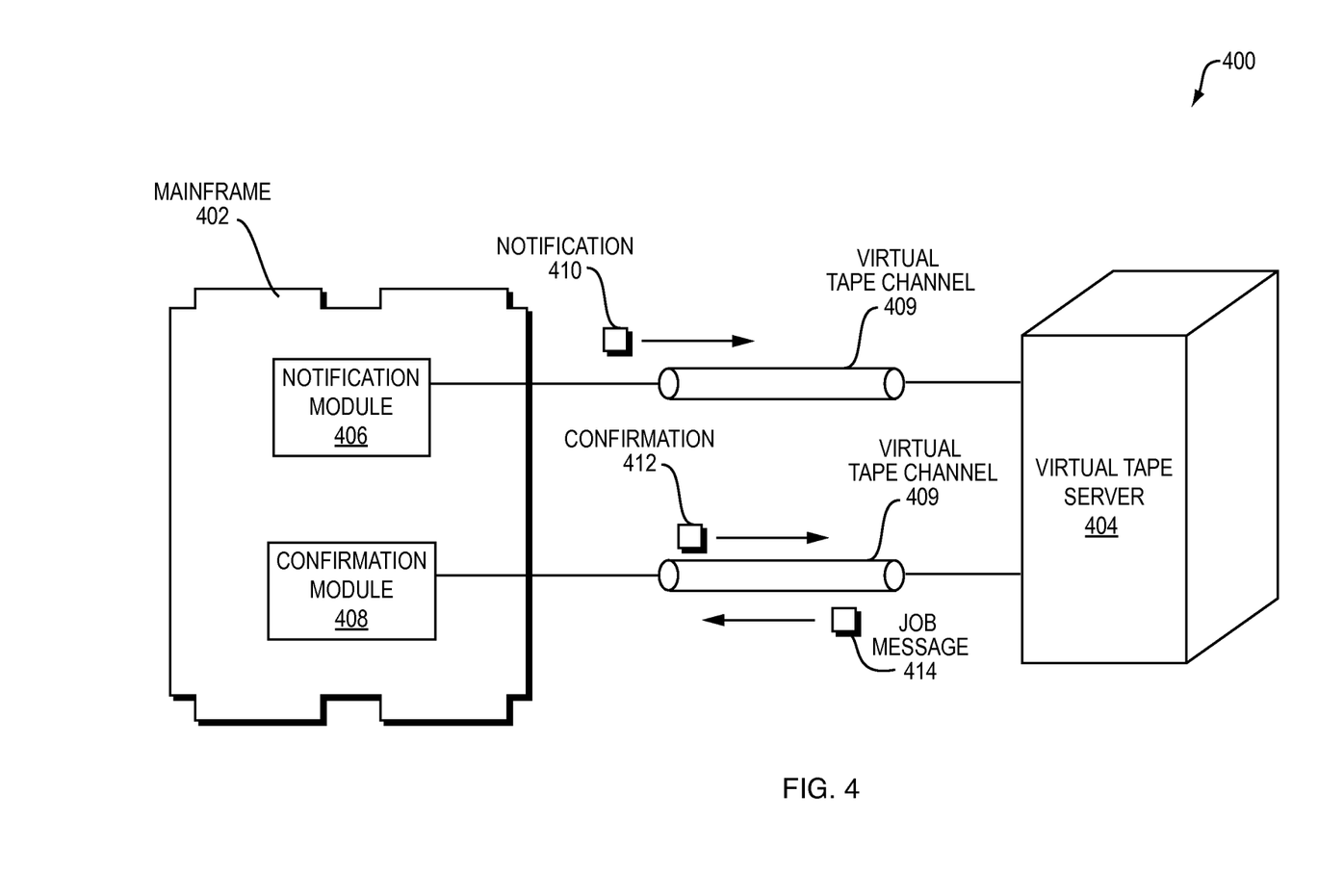
FIG. 4 is a block diagram illustrating an example embodiment of a mainframe operatively coupled to communicate with a virtual tape server.

FIG. 4 is a block diagram 400 illustrating an example embodiment of a mainframe 402 operatively coupled to communicate with a virtual tape server 404. The mainframe 402 includes a notification module 406 and a confirmation module 408. The notification module 406 of the mainframe 402 issues a notification 410 over a virtual tape channel 409 that the mainframe 402 is ready to receive a job to the virtual tape server 404. In response, the virtual tape server 404 retrieves job data of a job, and begins sending at least one job message 414 over the virtual tape channel 409 to the mainframe 402. Upon receiving the last job message 414, a confirmation module 408 issues a confirmation 412 from the mainframe 402 to the virtual tape server 404 over the virtual tape channel 409. The confirmation 412 indicates that mainframe 402 has received all of the job messages 414, and allows the virtual tape server 404 to know that the job was successfully sent.

Figure 5:
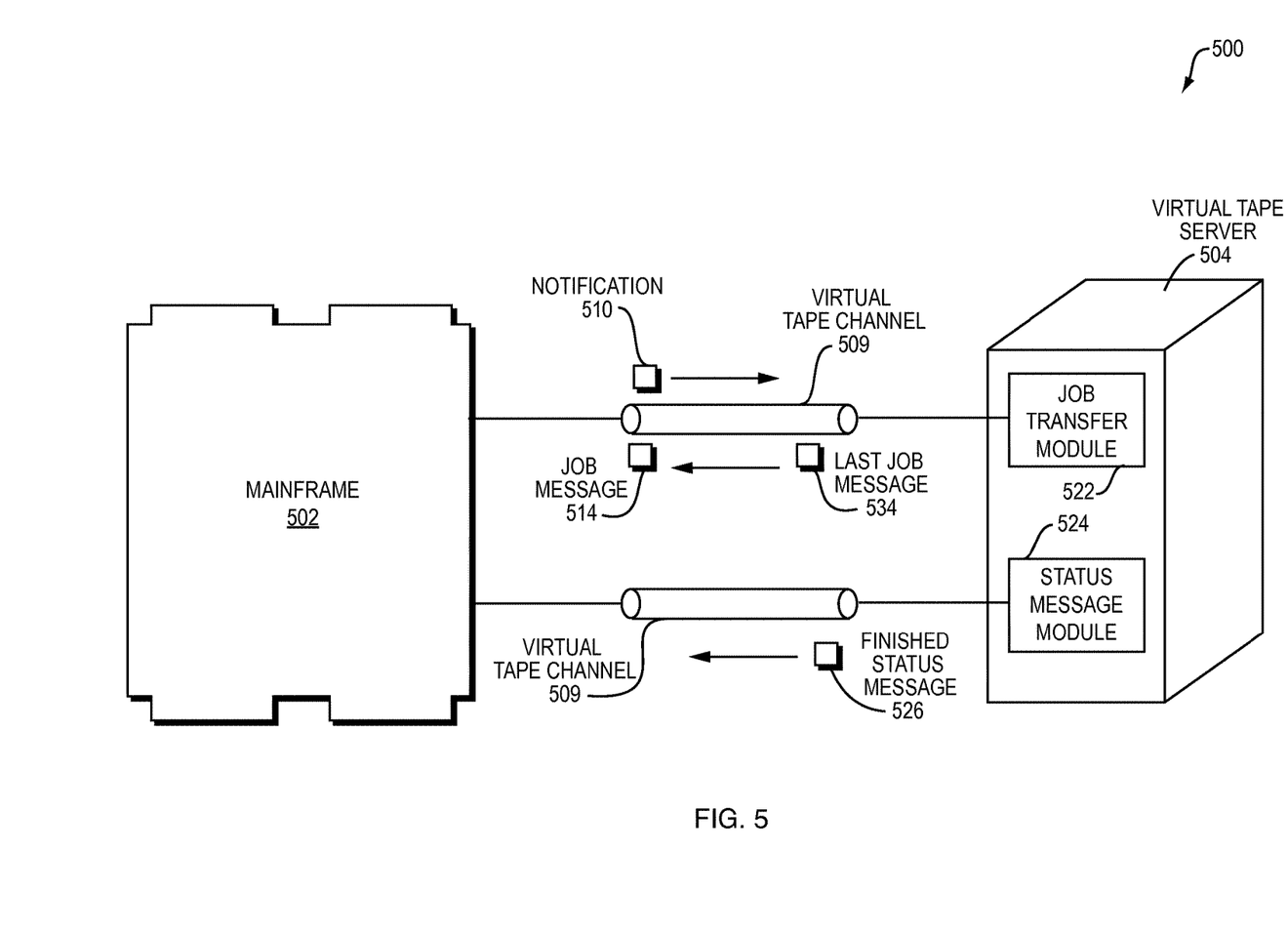
FIG. 5 is a block diagram illustrating an example embodiment of a mainframe operatively coupled with a virtual tape server.

FIG. 5 is a block diagram 500 illustrating an example embodiment of a mainframe 502 operatively coupled with a virtual tape server 504. The virtual tape server 504 includes a job transfer module 522 and a status message module 524. The job transfer module 522 receives a notification 510 from the mainframe 502 over a virtual tape channel 509 that the mainframe 502 is available to receive a job. The job transfer module 522 then begins sending job messages 514 to the mainframe 502. Upon the job transfer module 522 sending a last job message 534 (which, in some examples, can be the first job message if the job data fits in one message), the status message module 524 of the virtual tape server 504 sends a finished status message 526 over the virtual tape channel 509 to the mainframe. The finished status message 526 notifies the mainframe 502 that the job has been sent and the mainframe 502 can begin processing the job.

While embodiments of the present invention may employ any tape protocol or virtual tape protocol, an embodiment of the present invention uses a tape protocol employing FICON. An embodiment of the present invention employs a novel job submission protocol can be implemented using "Perform Subsystem Function" (PSF) and "Read Subsystem Data" (RSD) tape drive commands. A program on the mainframe host issues the PSF command to open a conversation with the VTS. The PSF command signals that it is ready to receive job scheduling commands (e.g., job readiness message 234 of FIG. 2, notification 410 of FIG. 4, and notification 510 of FIG. 5) at any time from the VTS. The program on the mainframe then issues RSD commands to the VTS to receive data (e.g., JTL data 230a-c of FIG. 2, Job Message 414 of FIG. 4, and Job Message 514 and Last Job Message 534 of FIG. 5) from the VTS. The received data includes host Job Control Language (JCL) for the jobs that the VTS has selected/queued for execution. The program on the mainframe, after receiving the data including the JCL job(s), then submits the jobs in JCL for the mainframe to execute.

The mainframe and the VTS communicate through the tape device protocol on a Fiber Connection (FICON) channel attachment. To the mainframe, the VTS presents itself as a set/collection of tape drives. The mainframe can issue commands to the VTS to write tape data to and read tape data from tape volumes. Typically, through the FICON channel, only tape data can be read or written. Other files that reside on the VTS platform are inaccessible to the mainframe through the FICON channel. A method of accessing these other files is described in "Out-Of-Band File Transfers Between A Host And Virtual Tape Server" by Larry W. McCloskey and Karyn M. Kelley, co-filed with the present application on the same day, assigned to a common Assignee and incorporated herein by reference in its entirety.

In addition, customers can impose a restriction that the mainframe and VTS are disconnected from any type of network interface. Potential existing methods that a personal computer or server (e.g., the VTS) can use to submit jobs for execution, such as Remote Job Entry (RJE), are unavailable to the VTS platform.

The job submission feature employs the Perform Subsystem Function (PSF) and Read Subsystem Data (RSD) Channel Command Words (CCWs) to transfer the Job Control Language (JCL) statements for submission. The CCWs are special-purpose commands supported by tape drives (e.g., all 3480/3490/3590 tape drives). The CCW commands are employed by mainframe software in other contexts to perform diagnostics and set special features on a tape drive.

In response to requests for the ability to perform more management of mainframe jobs from the VTS, the VTS can submit jobs for execution to the mainframe reader queue through an "out-of-band" protocol on the FICON channel interface. This feature uses tape-device protocols between the mainframe and the VTS over the channel. Further, it does not issue any commands or signals over any network interface between the mainframe and the VTS.

The mainframe runs an application to receive VTS job submissions over FICON that is run on demand. The application runs on the mainframe to receive job submissions from the VTS.

The mainframe application advertises its presence and availability to accept jobs from the VTS by sending a PSF CCW, with a new, unique function code, to the VTS. After issuing the PSF CCW, the mainframe issues a RSD CCW to receive the JCL from the VTS. The amount of data transferred with each RSD CCW is defined in the CCW sent by the mainframe in the CCW count field. The mainframe application continues to send RSD commands to the VTS until the VTS sends a unit exception (UX) ending status (e.g., End of Job Message 232 of FIG. 2, and Finished Status Message 526 of FIG. 5) on the last transfer of data that indicates the data read is complete. At this point, the mainframe application submits the job to its reader queue for execution.

The mainframe application then sends another PSF and RSD to indicate it is ready to receive any subsequent submissions from the VTS.

The VTS side of the job submission functionality is built into the VTS application. Initiation of job submission is controlled by a new VTS command, "SUBMIT". The "SUBMIT" command specifies the file that resides on the VTS that contains the Job Control Language (JCL) to be sent to the host. The "SUBMIT" command also specifies a virtual tape drive address. At the time of submission, this VTS has already received PSF and RSD commands from the mainframe that signals to the VTS that the mainframe is waiting for job submission by this device address, as described above. If the PSF/RSD commands are not active for this device, the SUBMIT command fails and the job submission is not sent over FICON.

When the VTS, responsive to the SUBMIT command, finds the host waiting for job submission, the VTS opens the specified JCL file and starts returning the file contents to the RSD commands sent by the host application. The VTS sends, in response to each RSD CCW issued by the mainframe, the amount of data requested in the RSD CCW count field. The VTS continues, in response to each subsequent RSD CCW, until the VTS reaches and transmits the end of the specified file. When the VTS reaches the end of the file, the VTS transmits the last segment of the data and returns the unit exception (UX) status to signal that the transmission is end of the file.

Upon receiving the UX status, the mainframe job submits the job for execution. Upon completion of the submission a PSF CCW, with a new, unique function code, reports the success or failure of the job submission to the VTS.

For a successful submission, the PSF data contains the mainframe job number of the submitted job. After receiving the job submission-complete PSF CCW from the mainframe, the VTS terminates the SUBMIT command because it knows the job has been successfully submitted for execution. The VTS does not receive a confirmation that the submitted job is run at the mainframe, but does receive the confirmation that it was transferred and submitted without error.

The job submission feature is enabled by adding a parameter to the VTS configuration file. An example of the parameter is "JOBSUBMISSION YES/NO."

The job submission feature is disabled by default. For example, specifying JOBSUBMISSION YES in the configuration file to enable it.

A "QUERY JOBSUBMISSION" command can display whether the job submission feature is enabled, and if so it displays information about the last 10 job submissions performed.

The SUBMIT command submits the specified file, via the specified device, for execution on the mainframe. The SUBMIT command can have the following format: "SUBMIT DEV=devicename FILE=filename"

At the time of execution, the specified device has an outstanding job-submission PSF/RSD command pending. If not, the SUBMIT command is rejected.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   by a system comprising a mainframe coupled to a virtual tape server through a channel connection, the channel connection:
   (i) configured as a direct communication path between the mainframe and the virtual tape server, the mainframe and the virtual tape server being disconnected from any type of network interface; and
   (ii) configured to support a mainframe to virtual tape protocol;
   notifying, from the mainframe, the virtual tape server that the mainframe is available to accept a job by sending a job readiness message to the virtual tape server over the channel connection, the job readiness message being native to the channel connection; and
   responsive to receiving at least one job data message of the job over the channel connection, sending, from the mainframe, a job receipt confirmation to the virtual tape server over the channel connection, the job receipt confirmation being native to the channel connection.

2. The method of claim 1, further comprising:
   receiving, at the mainframe, the at least one job data message.

3. The method of claim 1, further comprising:
   responsive to receiving a status message that a last of the at least one job data message of the job is sent, processing the job at the mainframe.

4. The method of claim 3, further comprising:
   responsive to finishing the processing of the job at the mainframe, notifying, from the mainframe, the virtual tape server that the mainframe is available to process a next job over the mainframe to virtual tape channel.

5. The method of claim 1, wherein the at least one job data message is based on job data in the virtual tape server, and the job data is stored in a non-virtual tape drive portion of the virtual tape server.

6. A system comprising:
   a mainframe coupled to a virtual tape server through a channel connection, the channel connection:
   (i) configured as a direct communication path between the mainframe and the virtual tape server, the mainframe and the virtual tape server being disconnected from any type of network interface; and
   (ii) configured to support a mainframe to virtual tape protocol;
   a processor;

a memory with computer code instructions stored thereon, the memory operatively coupled to the processor such that the computer code instructions cause the processor to implement:

notifying, from the mainframe, the virtual tape server that the mainframe is available to accept a job by sending a job readiness message to the virtual tape server over the channel connection, the job readiness message being native to the channel connection; and responsive to receiving at least one job data message of the job over the channel connection, sending, from the mainframe, a job receipt confirmation to the virtual tape server over the channel connection, the job receipt confirmation being native to the channel connection.

7. The system of claim 6, wherein the computer code instructions further cause the processor to implement receiving, at the mainframe, the at least one job data message.

8. The system of claim 6, wherein the computer code instructions further cause the processor to implement processing, responsive to a status message that a last of the at least one job data message of the job is sent, the job at the mainframe.

9. The system of claim 8, wherein the computer code instructions further cause the processor to implement notifying, responsive to finishing the processing of the job at the mainframe, from the mainframe, the virtual tape server that the mainframe is available to process a next job of over the virtual tape channel.

10. The system of claim 6, wherein the at least one job data message is based on job data in the virtual tape server, and the job data is stored in a non-virtual tape drive portion of the virtual tape server.

11. A method comprising:
by a system comprising a mainframe coupled to a virtual tape server through a channel connection, the channel connection:
(i) configured as a direct communication path between the mainframe and the virtual tape server, the mainframe and the virtual tape server being disconnected from any type of network interface; and
(ii) configured to support a mainframe to virtual tape protocol;
responsive to a notification from the mainframe that the mainframe is ready to accept a job, sending, from the virtual tape server, at least one job message of a job to the mainframe over the channel connection, the at least one job message being native to the channel connection; and
upon sending a last of the at least one job messages of the job to the mainframe, sending, from the virtual tape server, a finished status message indicating the job has been transferred to the mainframe over the channel connection, the finished status message being native to the channel connection.

12. The method of claim 11, further comprising:
receiving, at the virtual tape server, the notification that the mainframe is accepting the job.

13. The method of claim 11, further comprising:
loading the job from a non-virtual tape portion of the virtual tape server.

14. The method of claim 13, further comprising:
dividing the job into the at least one job messages.

15. The method of claim 11, wherein the at least one job data message is based on job data in the virtual tape server, and the job data is stored in a non-virtual tape drive portion of the virtual tape server.

16. A system comprising:
a mainframe coupled to a virtual tape server through a channel connection, the channel connection:
(i) configured as a direct communication path between the mainframe and the virtual tape server, the mainframe and the virtual tape server being disconnected from any type of network interface; and
(ii) configured to support a mainframe to virtual tape protocol;
a processor; and
a memory with computer code instructions stored thereon, the memory operatively coupled to the processor such that the computer code instructions cause the processor to implement:
responsive to a notification from the mainframe that the mainframe is ready to accept a job, sending, from the virtual tape server, at least one job message of a job to the mainframe over the channel connection, the at least one job message being native to the channel connection; and
upon sending a last of the at least one job messages of the job to the mainframe, sending, from the virtual tape server, a finished status message indicating the job has been transferred to the mainframe over the channel connection, the finished status message being native to the channel connection.

17. The system of claim 16, wherein the computer code instructions further cause the processor to implement receiving, at the virtual tape server, the notification that the mainframe is accepting the job.

18. The system of claim 16, wherein the computer code instructions further cause the processor to implement loading the job from a non-virtual tape portion of the virtual tape server.

19. The system of claim 18, wherein the computer code instructions further cause the processor to implement dividing the job into the at least one job messages.

20. The system of claim 16, wherein the at least one job data message is based on job data in the virtual tape server, and the job data is stored in a non-virtual tape drive portion of the virtual tape server.

* * * * *